United States Patent
Popelka et al.

(10) Patent No.: US 11,962,393 B2
(45) Date of Patent: Apr. 16, 2024

(54) NETWORK AGNOSTIC DYNAMIC SATCOM SYSTEM AND ASSOCIATED NETWORK FEATURES

(71) Applicant: Smiths Interconnect, Inc., Tampa, FL (US)

(72) Inventors: David Popelka, Alpharetta, GA (US); James Wilkerson, Oldsmar, FL (US); Shawn O'Brien, Sanit Petersburg, FL (US)

(73) Assignee: SMITHS INTERCONNECT, INC., Tampa, FL (US)

( * ) Notice: Subject to any disclaimer, the term of this patent is extended or adjusted under 35 U.S.C. 154(b) by 393 days.

(21) Appl. No.: 16/977,029

(22) PCT Filed: Mar. 8, 2019

(86) PCT No.: PCT/US2019/021400
§ 371 (c)(1),
(2) Date: Aug. 31, 2020

(87) PCT Pub. No.: WO2019/173742
PCT Pub. Date: Sep. 12, 2019

(65) Prior Publication Data
US 2020/0412442 A1    Dec. 31, 2020

Related U.S. Application Data

(60) Provisional application No. 62/640,339, filed on Mar. 8, 2018, provisional application No. 62/666,577, filed on May 3, 2018.

(51) Int. Cl.
*H04B 7/185* (2006.01)
(52) U.S. Cl.
CPC .............................. *H04B 7/18517* (2013.01)

(58) Field of Classification Search
CPC ............ H04B 7/18517; H04B 7/18528; H04B 7/1851
See application file for complete search history.

(56) References Cited

U.S. PATENT DOCUMENTS 6,233,451 B1    5/2001  Noerpel et al.
6,314,269 B1 *  11/2001 Hart .................. H04B 7/18539
                                                    455/12.1

(Continued)

FOREIGN PATENT DOCUMENTS

| CN | 103428784 | 12/2013 |
| CN | 105391490 | 3/2016 |

(Continued)

OTHER PUBLICATIONS

International Search Report and Written Opinion (dated Jun. 19, 2019) for Corresponding International PCT Patent Application No. PCT/US2019/021400, 11 pages.

*Primary Examiner* — Christine Ng
(74) *Attorney, Agent, or Firm* — Snell & Wilmer LLP (57) ABSTRACT

A system for network agnostic satellite communications includes an antenna configured to receive at least one antenna receive beam including multiple receive carriers multiplexed in at least one of frequency or time. The system further includes a signal processor configured to receive the multiple receive carriers and to extract data from at least one receive carrier of the multiple receive carriers. The system further includes an input device configured to receive at least one desirable communication parameter. The system further includes a control processor designed to determine actual parameters corresponding to the multiple receive carriers of the at least one antenna receive beam. The control processor is further designed to select an optimal receive carrier by comparing the at least one desirable communication param- (Continued)

eter to the actual parameters. The control processor is further designed to establish a current communication link with the optimal receive carrier.

20 Claims, 3 Drawing Sheets

(56) References Cited

U.S. PATENT DOCUMENTS

| | | | | |
|---|---|---|---|---|
| 6,741,573 | B1* | 5/2004 | Asaeda | H04B 7/18582 370/316 |
| 2001/0024961 | A1* | 9/2001 | Richter | H04W 8/22 455/553.1 |
| 2003/0161288 | A1 | 8/2003 | Unruh | |
| 2004/0008643 | A1* | 1/2004 | Guturu | H04W 36/06 370/329 |
| 2005/0124344 | A1* | 6/2005 | Laroia | H04W 36/18 455/436 |
| 2008/0045146 | A1* | 2/2008 | Wahlberg | H04B 7/18519 455/12.1 |
| 2008/0313037 | A1* | 12/2008 | Root | H04W 4/029 705/14.66 |
| 2008/0316969 | A1* | 12/2008 | Prakash | H04W 36/30 370/331 |
| 2010/0067454 | A1* | 3/2010 | Lee | H04W 72/21 370/328 |
| 2010/0284325 | A1 | 11/2010 | Yabo et al. | |
| 2010/0311468 | A1* | 12/2010 | Shi | H04W 12/42 455/558 |
| 2013/0252655 | A1* | 9/2013 | Kim | H04B 7/0491 455/509 |
| 2014/0302852 | A1* | 10/2014 | Ostergaard | H04W 36/32 455/436 |
| 2015/0188623 | A1* | 7/2015 | Angeletti | H04B 7/2041 455/13.3 |
| 2015/0381263 | A1 | 12/2015 | Lejnell et al. | |
| 2016/0088627 | A1* | 3/2016 | Tayrac | H04B 7/185 370/319 |
| 2016/0183126 | A1 | 6/2016 | Roy et al. | |
| 2016/0226150 | A1* | 8/2016 | Paleta, Jr. | H01Q 3/08 |
| 2017/0302522 | A1* | 10/2017 | Tonshal | H04L 41/0893 |
| 2018/0192438 | A1* | 7/2018 | John Wilson | H04W 74/004 |
| 2018/0270820 | A1* | 9/2018 | Gupta | H04W 28/082 |
| 2020/0204316 | A1* | 6/2020 | Zhang | H04L 5/0048 |

FOREIGN PATENT DOCUMENTS

| | | |
|---|---|---|
| EP | 0815701 | 1/1998 |
| EP | 2780980 | 9/2014 |
| KR | 10-2014-0028854 A | 3/2014 |
| WO | WO 96/28947 | 3/1996 |
| WO | WO 2013/096181 | 6/2013 |
| WO | WO 2017/096637 | 6/2017 |

* cited by examiner

NETWORK AGNOSTIC DYNAMIC SATCOM SYSTEM AND ASSOCIATED NETWORK FEATURES

CROSS-REFERENCE TO RELATED APPLICATIONS

This application claims the benefit and priority of U.S. Provisional Application No. 62/640,339, entitled "NETWORK AGNOSTIC DYNAMIC SATCOM REMOTE TERMINAL AND ASSOCIATED NETWORK FEATURES," filed on Mar. 8, 2018, and U.S. Provisional Application No. 62/666,577, entitled "NETWORK AGNOSTIC DYNAMIC SATCOM REMOTE TERMINAL AND ASSOCIATED NETWORK FEATURES," filed on May 3, 2018, the entire disclosure of both being hereby incorporated by reference herein in their entirety.

BACKGROUND

1. Field

The present disclosure relates to systems and methods for providing network agnostic dynamic satellite communications.

2. Description of the Related Art

The satellite communication (SATCOM) industry currently includes multiple private networks and remote terminals that are designed to only operate within their corresponding network. In many situations, multiple satellites may be in view of the terminal, and each satellite may have multiple accessible data channels and networks. However, current systems fail to allow access to a more optimal connection, when such connection exists, because of the hardware and software limitations of current remote terminals, and because of the absence of a method to dynamically assign satellite link resources to remote users on demand. For example, a remote terminal may have the capability to connect only to a first satellite via a first carrier, while the same satellite may be capable of communicating via a second carrier that has a more desirable parameter (such as network speed, cost per bit of data, or the like). Current terminals may be incapable of taking advantage of such alternative carriers, leaving the user with undesirable network parameters.

Thus, there is a need in the art for systems and methods for providing dynamic selection of an optimal satellite, channel, and network connection.

SUMMARY

Disclosed herein is a system for network agnostic satellite communications. The system includes an antenna configured to receive at least one antenna receive beam including multiple receive carriers multiplexed in at least one of frequency or time. The system further includes a signal processor configured to receive the multiple receive carriers and to extract data from at least one receive carrier of the multiple receive carriers. The system further includes an input device configured to receive at least one desirable communication parameter. The system further includes a control processor designed to determine actual parameters corresponding to the multiple receive carriers of the at least one antenna receive beam. The control processor is further designed to select an optimal receive carrier by comparing the at least one desirable communication parameter to the actual parameters. The control processor is further designed to establish a current communication link with the optimal receive carrier.

Also disclosed is a method for network agnostic satellite communications. The method includes receiving or determining, by a processor of a satellite communication terminal, at least one desirable communication parameter. The method further includes receiving or determining, by the processor, actual parameters corresponding to multiple satellite networks. The method further includes selecting, by the processor, an optimal satellite network by comparing the at least one desirable communication parameter to the actual parameters. The method further includes establishing, by the processor, a current communication link between the processor and the optimal satellite network.

Also disclosed is a method for network agnostic satellite communications includes receiving, by an antenna, at least one antenna receive beam having multiple receive carriers multiplexed in at least one of frequency or time. The method further includes extracting, by a signal processor, data from at least one receive carrier of the multiple receive carriers. The method further includes receiving, by an input device, at least one desirable communication parameter. The method further includes determining, by a control processor, actual parameters corresponding to the multiple receive carriers of the at least one antenna receive beam. The method further includes selecting, by the control processor, an optimal receive carrier by comparing the at least one desirable communication parameter to the actual parameters. The method further includes establishing, by the control processor, a current communication link with the optimal receive carrier.

BRIEF DESCRIPTION OF THE DRAWINGS

Other systems, methods, features, and advantages of the present disclosure will be or will become apparent to one of ordinary skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

Disclosed herein is a remote satellite communication (SATCOM) system, including terminal architecture (e.g., a remote terminal receiver/terminal architecture), that takes full advantage of all available satellite capacity (satellite location, transponder bandwidth (BW), antenna coverage, etc.) by dynamically selecting the best link available from all available satellite providers. The best link at any given time may be defined by the remote user based on user concerns; i.e., cost per bit, response time, needed BW, reliability, link congestion, achievable signal to noise ratio (SNR) or bit error rate (BER), user hardware constraints, data security, etc. For example, the user may provide the desirable link/ communication parameters via an input device. In some embodiments, a processor of the terminal may determine the desirable communication parameters based on previous user history. Switching from one SATCOM link to another may be achieved with minimal penalty (data interruption, cost, etc.) and may be automated if desired, based on a user controlled ranking algorithm. Groups of users may also form aggregations (private networks, etc.) to manage link performance and access for their group.

The present disclosure describes remote terminal radio frequency (RF) hardware that is capable of switching between links and can provide the necessary RF performance to support any desired link. This may include general purpose RF hardware with transmit (TX) power, receive (RX) gain and noise, center frequency, and bandwidth performance that can support some or all available links and may be relatively rapidly tuned to the desired configuration.

Remote terminal signal processing of the systems and methods herein may be capable of supporting all potential protocols (i.e., modulation and demodulation waveforms, encoding and decoding algorithms, etc.). For example, a processor may have sufficient power to switch between each protocol relatively quickly, and the memory may be sufficiently large to store each protocol. The hardware and/or software may be capable of switching between different modulation and coding schemes rapidly and at a minimal cost, i.e., lost data, dead time, etc. This may be implemented by a software defined signal processing architecture utilized in a hardware receiver with processing speed and memory capability to allow rapid context switching and maintenance of multiple stored configurations and associated data. In some embodiments, this may be performed by dedicated hardware, specialized software, or a combination of dedicated hardware and software.

Remote terminal network management functions (satellite and frequency assignment, TDMA timing, uplink power control, satellite pointing and tracking, etc.) of the present disclosure may be compatible with some or all available satellite capacity providers. The remote terminal may be quickly switchable between different network control schemes. This may require sufficient processing speed and memory capability to allow rapid context switching and maintenance of multiple stored configurations and associated data.

Remote terminal management functions of the present disclosure may allow for user-defined priority of data types (e.g., voice communication, data communication, video, banking, or the like) to allow transmission of lower priority data types to be buffered and deferred to periods of lower network traffic or until the cost per bit drops below a defined threshold.

A pool of satellite capacity may be designed to be available for use on a dynamic assignment basis. This dynamic capacity pool may be achieved by making agreements with existing providers to allow dynamic use of a portion of their capacity, or by resellers purchasing fixed amounts of satellite capacity from existing providers to be resold dynamically. It may be desirable for providers to provide sufficient information to allow dynamic remote terminals to gain access to their networks when needed.

A method for dynamically requesting and granting bandwidth assignments may be achieved by providing one or more reservation control links to allow remote users to dynamically request, accept, and release needed bandwidth. Also, reservation control packets may be incorporated within user data links.

The present disclosure further describes a method for monitoring relevant characteristics of each available network to determine network rank. Some data may be locally measured (such as signal strength) but other useful characteristics may also be provided to the remote users by the provider (e.g., pricing structures, current network traffic, expected response time, available future bandwidth slots, etc.). This data may be provided together with bandwidth assignment data traffic or by a separate link.

An exemplary implementation of the present disclosure may incorporate use of a remote terminal with an antenna system and an integrated radio frequency (RF) transmit and receive (T/R) module, which may include a processor and a memory. The integrated RF T/R module may be implemented with general purpose RF hardware such as frequency converters, filters, and amplifiers, combined with an analog to digital converter (ADC) to accept and digitize the received analog signal and a digital to analog converter (DAC) to generate the transmitted analog signal. In some embodiments, the integrated RF T/R module may be implemented with specialized hardware, or a combination of hardware and software. Digital processing and software may be provided to accomplish the necessary conversion of the ADC receive and DAC transmit digital signals to and from the desired mission data, manage the system or network access and coordination, and control RF hardware behavior such as center frequency, gain and analog bandwidth.

The antenna system may differ depending on the application environment. The remote terminal may switch between all providers located in a single direction (all GEO satellites in one orbital slot, for example) using a dish or panel antenna system with manual or slow pointing. With an agile or multi-beam antenna (active or passive electronically scanned arrays, or ESAs, for example) the remote terminal may re-point rapidly to access providers in many different directions. Minimum data loss concerns may be satisfied using an agile antenna for switching between LEO satellites as each new satellite moves into view or for switching between multiple geosynchronous orbital slots.

The present disclosure provides multiple benefits and advantages. For example, remote users may have increased flexibility to manually choose the best provider based on current data traffic needs, or may allow the remote terminal to determine the best provider automatically based upon user-defined selection criteria. Additionally, remote users may access their desired link capacity (large or small) without paying in advance for infrequently used excess capacity or experiencing lower than desired link capacity. Remote users may recover from poor performance on a given provider (outage, low signal strength, congestion, etc.) by switching to a provider with better performance. Also, remote users may use two providers sequentially as redundant data paths and greatly reduce the probability of critical data loss. Remote users may use two providers simultaneously to increase available communication bandwidth for large bandwidth communications. Additionally, remote terminal cost may be lower than current multiple provider systems that contain separate hardware for each provider.

Additional advantages include that providers may reduce the likelihood of under-used or over-used (congested) data links by allowing users to be dynamically distributed as needed. Total satellite effective bandwidth may increase due to more efficient use. Providers may enter the dynamic capacity pool to receive revenue from temporarily available excess capacity and may withdraw capacity as needed to provide for fixed users. Fixed users may enter the dynamic capacity pool to resell their temporarily available excess capacity. Dynamic capacity management services may derive revenue from maintaining the dynamic capacity pool.

The systems and methods herein may present difficulties, which may be overcome with design considerations. For example, dynamic assignment of bandwidth may require additional overhead traffic, reducing the effective maximum capacity compared to constant fixed usage. For high traffic users, cost per bit of dynamic traffic may be higher than a fully used fixed channel due to management fees and reservation and management data overhead. Also, remote terminal hardware may be more complex than equivalent single network systems, although the methods may be implemented on existing remote terminals by applying new software to the existing terminals.

Figure 1:
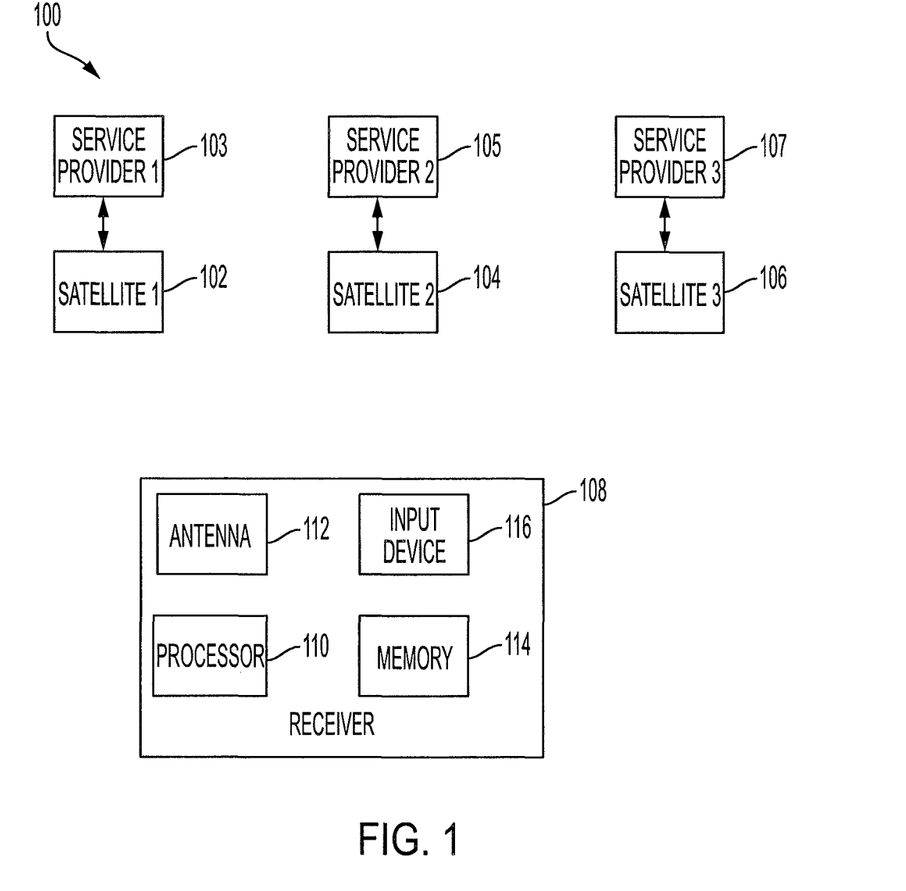
FIG. 1 is a block diagram illustrating a system for network agnostic satellite communications according to an embodiment of the present disclosure.

Referring now to FIG. 1, a system 100 for network agnostic satellite communications is shown. The system 100 may include a first satellite 102 connected to a first service provider 103, a second satellite 104 connected to a second service provider 105, and a third satellite 106 connected to a third service provider 107. The system 100 may further include a remote terminal receiver 108. The receiver 108 may include a processor 110, an antenna 112, and a memory 114. The antenna 112 may transmit data to, and receive data from, each of the satellites 102, 104, 106. The memory 114 may store algorithms or other communication data (such as protocols) usable to communicate with each of the satellites 102, 104, 106. For example, communication with the first satellite 102 may be performed using a first protocol, and communication with the second satellite 104 may be performed using a second protocol that is different than the first protocol. In that regard, the memory 114 may store both protocols.

The receiver 108 may further include an input device 116 for receiving desirable communication parameters. The processor 110 may facilitate the communication with each of the satellites 102, 104, 106 based on the desirable communication parameters. The desirable communication parameters may include, for example, at least one of a cost per bit of data transferred, a cost per minute of voice data, a response time of the multiple satellite networks, an available bandwidth of the multiple satellite networks, a reliability of the multiple satellite networks, link congestion of the multiple satellite networks, a signal to noise ratio, a bit error rate, data security level or features, or a hardware constraint of the satellite communication receiver 108.

The processor 110 may identify actual parameters based on signals received from each of the satellites 102, 104, 106, may receive the actual parameters from the satellites 102, 104, 106, or both. For example, the processor 110 may identify a bit error rate by performing a calculation based on signals received from the satellites 102, 104, 106, and may receive a cost per bit of data transferred from the satellites 102, 104, 106.

Figure 2:
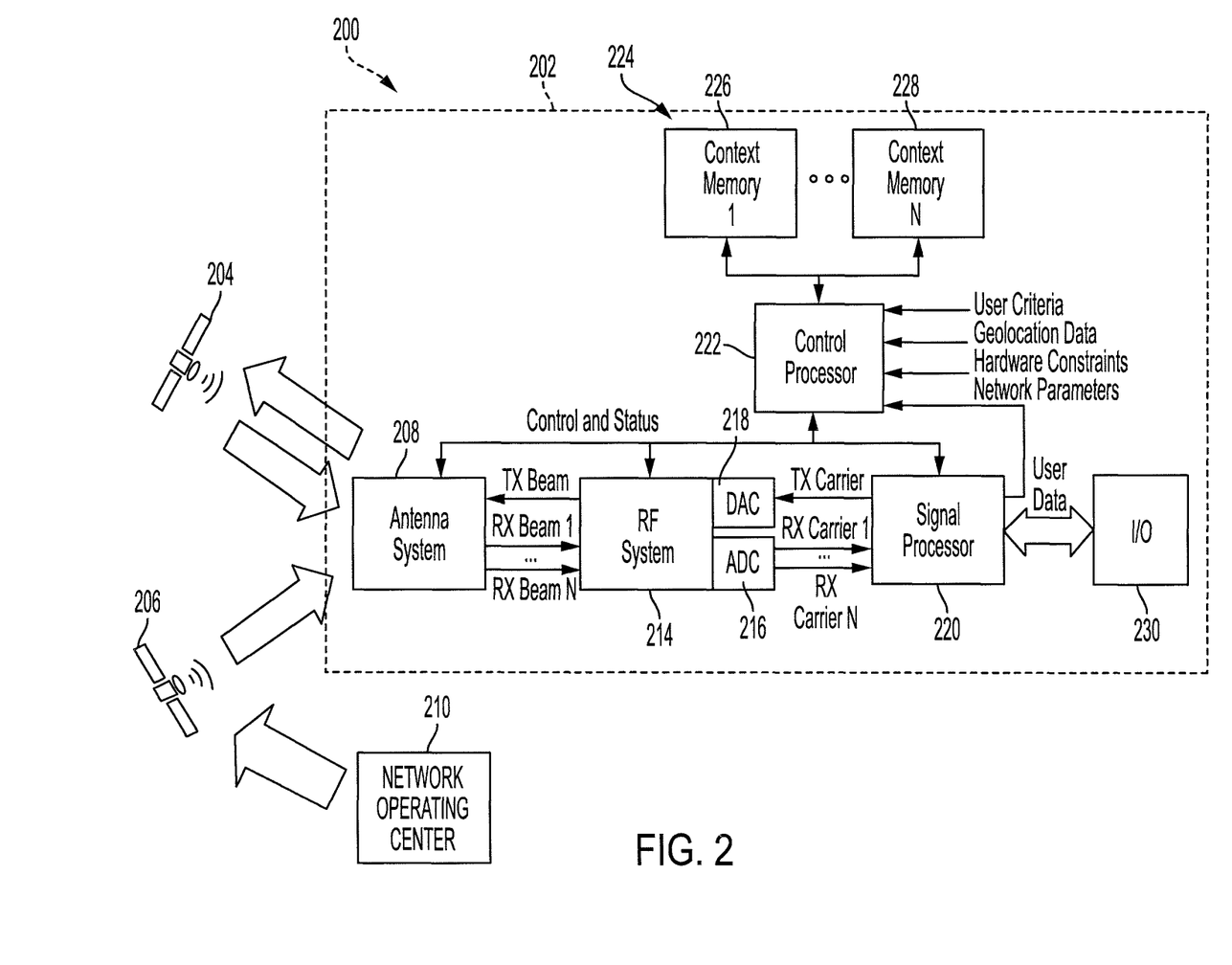
FIG. 2 is a block diagram illustrating a system for network agnostic satellite communications according to an embodiment of the present disclosure.

Referring now to FIG. 2, an example of a system 200 having a novel SATCOM remote terminal 202 (which may be used as the receiver 108 of FIG. 1) capable of communicating with multiple SATCOM networks is shown. The system 200 may include multiple satellites, including a first satellite 204 and a second satellite 206, a network operating center 210, and the remote terminal 202. The remote terminal 202 may be capable of communicating with either satellite 204, 206 and via multiple carriers (i.e., networks) associated with each satellite 204, 206. Where used herein, "carrier" may refer to a time-division multiplex (TDM) signal, a frequency-division multiplex (WDM) signal, or any other SATCOM signal, carrier, network, or the like. The remote terminal 202 may also be capable of communicating with the network operating center 210 via one or more of the visible satellites 204, 206 and associated carriers.

The remote terminal 202 may include an antenna or antenna system 208, a radio frequency (RF) processor 214, an analog-to-digital converter (ADC) 216, a digital-to-analog converter (DAC) 218, a signal processor 220, a control processor 222, and one or more context memory 224. The remote terminal 202 may further include an input/output port or device 230 that can at least one of receive user input or output data to be received by a user.

The antenna or antenna system 208 may include any antenna capable of receiving a signal transmitted or reflected by one or more satellite 204, 206. For example, the antenna 208 may include a dish or panel antenna system that can be manually or automatically oriented in a desired direction, an agile or multi-beam antenna (such as an active or passive electronically scanned array, or ESA, for example), or the like. In some embodiments, the antenna 208 may be capable of communicating with only one satellite 204, 206 at any given time or may be capable of communicating with multiple satellites 204, 206 at any given time. In some embodiments, the antenna 208 may be capable of communicating with one or more of the satellites 204, 206 and the network operating center 210 simultaneously.

The input/output port or device 230 may include any one or more input device and/or one or more output device such as a mouse, a keyboard, a touchscreen, a display, a speaker, a microphone, or the like. The input port or device 230 may further include any one or more network access port capable of communicating via a wired or wireless protocol such as Bluetooth, Wi-Fi, Ethernet, or the like.

In some embodiments, each of the RF processor 214, the ADC 216, the DAC 218, the signal processor 220, and the control processor 222 may be implemented in separate devices. In some embodiments, at least two (including all) of the RF processor 214, the ADC 216, the DAC 218, the signal processor 220, or the control processor 222 may be implemented in a single processor, controller, or other logic device.

The RF processor 214 may include any controller or processor capable of transmitting and/or receiving radio frequency signals. For example, the RF processor 214 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof.

The RF processor 214 may receive one or more antenna receive beam from the antenna 208. For example, the antenna 208 may receive an antenna receive beam from each of the satellites 204, 206 and may transmit the antenna receive beams to the RF processor 214. In some embodiments, the antenna 208 may transmit multiple antenna receive beams to the RF processor 214 simultaneously and, in some embodiments, the antenna 208 may transmit a single antenna receive beam to the RF processor 214 at any given time.

Any antenna receive beam may include multiple receive carriers (i.e., any antenna receive beam may include multiple channels of data which may be partitioned by frequency or otherwise). The RF processor 214 may separate each of the receive beams into the multiple receive carriers. In some embodiments, the RF processor 214 may be unnecessary, particularly if the multiple receive carriers are provided as frequency-division multiplexing (FDM) or time-division multiplexing (TDM) signals.

The multiple receive carriers may be analog signals. However, it may be desirable to convert the analog receive carriers into digital signals. In that regard, the ADC 216 may convert each of the analog receive carriers output by the RF processor 214 into a digital signal (i.e., a digital receive carrier).

In a similar manner, the DAC 218 may receive a digital signal from the signal processor 220 (i.e., a digital transmit carrier) and may convert the digital signal into an analog signal (i.e., an analog transmit carrier). The RF processor 214 may convert the analog signal into an antenna transmit beam and may transmit the antenna transmit beam to the antenna 208 for transmission to one of the satellites 204, 206.

The signal processor 220 may include, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof.

The signal processor 220 may receive the multiple digital receive carriers from the ADC 216 and may extract data, such as user data or communication parameters, from one or more of the multiple digital receive carriers. For example, the signal processor 220 may de-packetize data on one or more digital receive carrier and may transmit the de-packetized data to an output device 230. Similarly, the signal processor 220 may receive user data to be transmitted via a transmit carrier and may place the user data on a digital transmit carrier (e.g., may packetized the user data).

The control processor 222 may include, for example, a general-purpose processor, a digital signal processor (DSP), an application specific integrated circuit (ASIC), a field programmable gate array (FPGA) or other programmable logic device, discrete gate or transistor logic, discrete hardware components, or any combination thereof.

The control processor 222 may receive data from one or more of the antenna 208, the RF processor 214, the signal processor 220, or an input device 230. For example, the control processor 222 may receive desirable communication parameters from the input device 230. In some embodiments, the desirable communication parameters may be stored in a memory 224.

The desirable communication parameters may include user input indicating desirable features of one or more of a receive carrier or a transmit carrier. For example, the desirable communication parameters may include at least one of a cost per bit of data transferred, a cost per minute of voice data, a response time of the multiple satellite networks, an available bandwidth of the multiple satellite networks, a reliability of the multiple satellite networks, link congestion of the multiple satellite networks, a signal to noise ratio, a bit error rate, data security level or features, or a hardware constraint of the satellite remote terminal 202. Where used in this context, a satellite network may refer to a transmit carrier, a receive carrier, or a transmit carrier and receive carrier pair.

The control processor 222 may further identify actual parameters of each of the carriers for one or more satellite beam. In some embodiments, the actual parameters may be measured by the antenna 208 and transmitted from the antenna 208 to the control processor 222. For example, the antenna 208 may be capable of measuring an amplitude of a receive beam and may transmit the amplitude of the receive beam to the control processor 222 as one of the actual parameters.

In some embodiments, the actual parameters may be measured by the RF processor 214 and transmitted to the control processor 222 from the RF processor 214. For example, the RF processor 214 may be capable of calculating at least one of an amplitude or a frequency of a receive carrier signal and may transmit the at least one of the amplitude or the frequency to the control processor 222 as one or more actual parameters.

In some embodiments, the actual parameters may be measured by the signal processor 220 and transmitted to the control processor 222 by the signal processor 220. For example, the signal processor 220 may be capable of calculating a bit error rate by performing calculations on one or more receive carrier signal, and may transmit the bit error rate to the control processor 222 as one or more actual parameters.

In some embodiments, the actual parameters may be transmitted by the corresponding satellite 204, 206. For example, each satellite may send one or more network management link that includes one or more actual parameter, such as a cost per bit of data for each carrier on each satellite beam or an expected data transfer rate for each carrier on each satellite beam. In that regard, the RF processor 214 or the signal processor 220 may extract the one or more actual parameters from the network management link of the satellites 204, 206 and may transmit the one or more actual parameters to the control processor 222.

In some embodiments, a network operating center 210 may transmit a network management link to the antenna 208. The network management link may include one or more actual parameter such as a cost per bit to upload and/or download data on each available carrier, an expected data transfer rate on each carrier, or the like.

The control processor 222 may select an optimal satellite network (i.e. an optimal transmit carrier and/or receive carrier) based on a comparison of the desirable communication parameters (as provided by a user) and the actual parameters (as received, calculated, or measured by one or more of the antenna 208, the RF processor 214, the signal processor 220, or the control processor 222). The control processor 222 may select the optimal carrier as the carrier that best matches the desirable communication parameters. For example, if the desirable communication parameters include a desire to minimize cost for data transfer, the control processor 222 may select a transmit carrier and receive carrier pair that has the lowest data transfer costs. As another example, if the desirable communication parameters include a desire for fastest data transfer rate, the control processor 222 may select a transmit carrier and receive carrier pair that has the fastest data transfer rate (or the least amount of other user traffic).

In some embodiments, the transmit carriers and the receive carriers may be paired together. In such embodiments, the control processor 222 may select a receive carrier and transmit carrier pair that best satisfies the desirable communication parameters. In some embodiments, the transmit carriers and the receive carriers may be separated such that the control processor 222 may select one transmit carrier and one unrelated receive carrier. In such embodiments, the control processor 222 may select a transmit carrier that best satisfies the desirable communication parameters and may select a receive carrier that best satisfies the desirable communication parameters. In some embodiments, the desirable communication parameters may include a first set of parameters for receive carriers and a second, different, set of parameters for transmit carriers. In such embodiments, the control processor 222 may select a receive carrier that satisfies the desirable receive parameters, and a transmit carrier that satisfies the desirable transmit parameters. In some embodiments, the desirable communication parameters are applicable to both transmit carriers and receive carriers.

The control processor 222 may further determine an optimal carrier based on geolocation data corresponding to a current location of the remote terminal 202. In some embodiments, the remote terminal 202 may include information or a device usable to identify the current geolocation of the remote terminal 202. For example, the remote terminal 202 may include a global positioning system (GPS) sensor capable of detecting the current geolocation of the remote terminal 202. In some embodiments, the remote terminal 202 may include an inertial measurement unit (IMU) usable to determine the current geolocation of the remote terminal 202. In some embodiments, the remote terminal 202 (such as the control processor 222) may be capable of determining the current geolocation of the remote terminal 202 based on a triangulation of received satellite beams from two or more satellites 204, 206.

In some embodiments, the control processor 222 may further determine an optimal carrier based on hardware constraints of the remote terminal 202. For example, the antenna 208 may be capable of receiving a first type of satellite beam and unable to receive a second type of satellite beam. In that regard, the control processor 222 may select a carrier that is located on a satellite beam of the first type. As another example, the RF processor 214 may be capable of extracting carriers from a first type of satellite beam but unable to extract carriers from a second type of satellite beam. In that regard, the control processor 222 may select a carrier that is located on a satellite beam of the first type.

In some embodiments, the control processor 222 may determine an optimal carrier based on network parameters. The network parameters may be received via a network management link (or stored in one or more context memory 224) and may include parameters such as whether a network access code is available for a given carrier, a current usage rate of each of the carriers (i.e., network traffic on each of the carriers), a quantity of other users on each of the carriers, or the like.

Once the control processor 222 determines an optimal receive carrier and transmit carrier, the control processor 222 may establish a connection between the remote terminal 202 and a corresponding satellite 204, 206 on the optimal receive carrier and transmit carrier. For example, the control processor 222 may control or instruct the signal processor 220 to transmit data received from an input device 230 on the desirable transmit carrier, and to convert data received on the desirable receive carrier into data to be output by an output device 230.

After establishing the connection between the remote terminal 202 and the corresponding satellite 204, 206 on the optimal receive carrier and transmit carrier, the control processor 222 may store a network configuration associated with the connection (i.e., may store settings associated with the connection) in a context memory 224. For example, the control processor 222 may store a first network configuration in a first context memory 226 that the control processor 222 may easily access or retrieve at a later time in order to quickly establish a connection on a first optimal transmit and receive carrier.

After a period of time, the control processor 222 may identify a new optimal transmit and receive carrier based on a continuous or periodic comparison of the desirable communication parameters and the actual parameters. In response to identifying a new optimal transmit and receive carrier, the control processor 222 may control the remote terminal 202 to establish a connection with a corresponding satellite 204, 206 on the new optimal transmit and receive carrier. For example, the control processor 222 may control the antenna 208 to be directed towards the corresponding satellite 204, 206, may control the RF processor 214 to divide the receive beam that corresponds to the corresponding satellite 204, 206, and may control the signal processor 220 to encode and/or decode data that is associated with the new optimal carrier.

If the remote terminal 202 has previously established a connection with the new optimal carrier, a network configuration corresponding to the new optimal carrier may be stored in a second context memory 228. In that regard, the second context memory 228 may include information usable by the control processor 222 to control the antenna 208, the RF processor 214, and the signal processor 220 to quickly establish the connection over the new optimal transmit and receive carrier. In that regard, the control processor 222 may retrieve the network configuration from the context memory 228 and may control the antenna system 208, the RF processor 214, and the signal processor 220 according to the network configuration stored in the context memory 228.

If the remote terminal has not previously established the connection with the new optimal transmit and receive carrier, the control processor 222 may identify how to establish the connection with the new optimal transmit and receive carrier, may control the antenna 208, the RF processor 214, and the signal processor 220 accordingly, and may store the new network configuration (i.e., information usable to quickly reestablish the connection with the new optimal carrier) in one of the context memories 224.

If the control processor 222 later identifies that the previous optimal carrier is again a new optimal carrier, the control processor 222 may retrieve the network configuration stored in the context memory 226 and control the antenna 208, the RF processor 214, and the signal processor 220 based on the network configuration stored in the first context memory 226 to quickly reestablish the connection with the previous optimal transmit and receive carrier.

Each of the context memories 224 may include a specific network configuration. The specific network configuration may include various items of information usable by the control processor 222 to establish a connection with a carrier. For example, each of the context memories 224 may store a carrier frequency that is associated with a carrier. The carrier frequency may correspond to a frequency at which a carrier is transmitted and/or received.

As another example, each of the context memories 224 may store at least one of a modulation or a demodulation waveform definition. The modulation or demodulation waveform definition may be usable by the RF processor 214 or the signal processor 220 to modulate or demodulate user data to be transmitted to or received by, respectively, one of the satellites 204, 206.

As another example, each of the context memories 224 may store at least one of an encoding or a decoding algorithm definition. The encoding or decoding algorithm definition may be usable by the RF processor 214 or the signal processor 220 to encode or decode user data to be transmitted to or received by, respectively, one of the satellites 204, 206.

As another example, each of the context memories 224 may store a satellite ephemeris corresponding to the satellite 204, 206 that is associated with the corresponding carrier of the context memory 224. The control processor 222 may use the satellite ephemeris, along with the current geolocation of the remote terminal 202, to control the antenna 208 to be pointed in an optimal direction to receive the corresponding beam.

As another example, each of the context memories 224 may store a network access parameter. The network access parameter may include, for example, a network access code, a passcode, or the like usable by the RF processor 214 or the signal processor 220 to establish a connection with a given carrier.

As another example, each of the context memories 224 may store one or more locally measured network performance parameter. For example, the locally measured network performance parameter may include a bit error rate, a data transfer rate, or the like that was measured or detected by the RF processor 214, the signal processor 220, or the control processor 222 for the corresponding carrier.

As another example, each of the context memories 224 may store one or more externally provided network performance parameter. For example, the externally provided network performance parameter may include an expected or measured data transfer rate, an expected or measured bit error rate, or the like that is expected to be achieved over the corresponding carrier or has been measured by the corresponding carrier. Such externally provided network performance parameters may be received via a network management link from one of the satellites 204, 206. For example, the network management link may be transmitted from the network operating center 210 to one or more of the satellites 204, 206 and reflected or re-transmitted to the remote terminal 202.

As another example, each of the context memories 224 may store a user history with the corresponding carrier. For example, the user history may include how much data was transmitted and/or received over the corresponding carrier, a time of connection or disconnection with the corresponding carrier, or the like.

As another example, each of the context memories 224 may store a ranking of the corresponding transmit or receive carrier. For example, the ranking may be provided by a user or may be determined by the control processor 222. For example, the ranking may be based on a bit error rate, a data transfer speed, a cost of data transfer, and/or one or more other communication parameter.

As another example, each of the context memories 224 may store a data priority. The data priority may correspond to an amount of priority that the corresponding transmit or receive carrier assigns to data transmitted or received by the remote terminal 202. In some embodiments, the data priority may correspond to the priority of the data, as ranked by the user, that is transmitted or received on the transmit or receive carrier.

As another example, each of the context memories 224 may store a data schedule. The data schedule may include, for example, a day and/or time at which certain data is to be transmitted or received via a given carrier.

As another example, each of the context memories 224 may store a data buffer. The data buffer may include data that was requested to be transmitted or received via the corresponding carrier but failed to be transmitted or received prior to disconnection with the corresponding carrier. In that regard, the information in the data buffer may be transmitted during a subsequent connection with the corresponding carrier, or may be provided to the user via the output device 230 during a subsequent connection with the corresponding carrier.

In some embodiments, each context memory 224 may be associated with only one receive carrier or may be associated with a receive carrier and transmit carrier pair.

Figure 3:
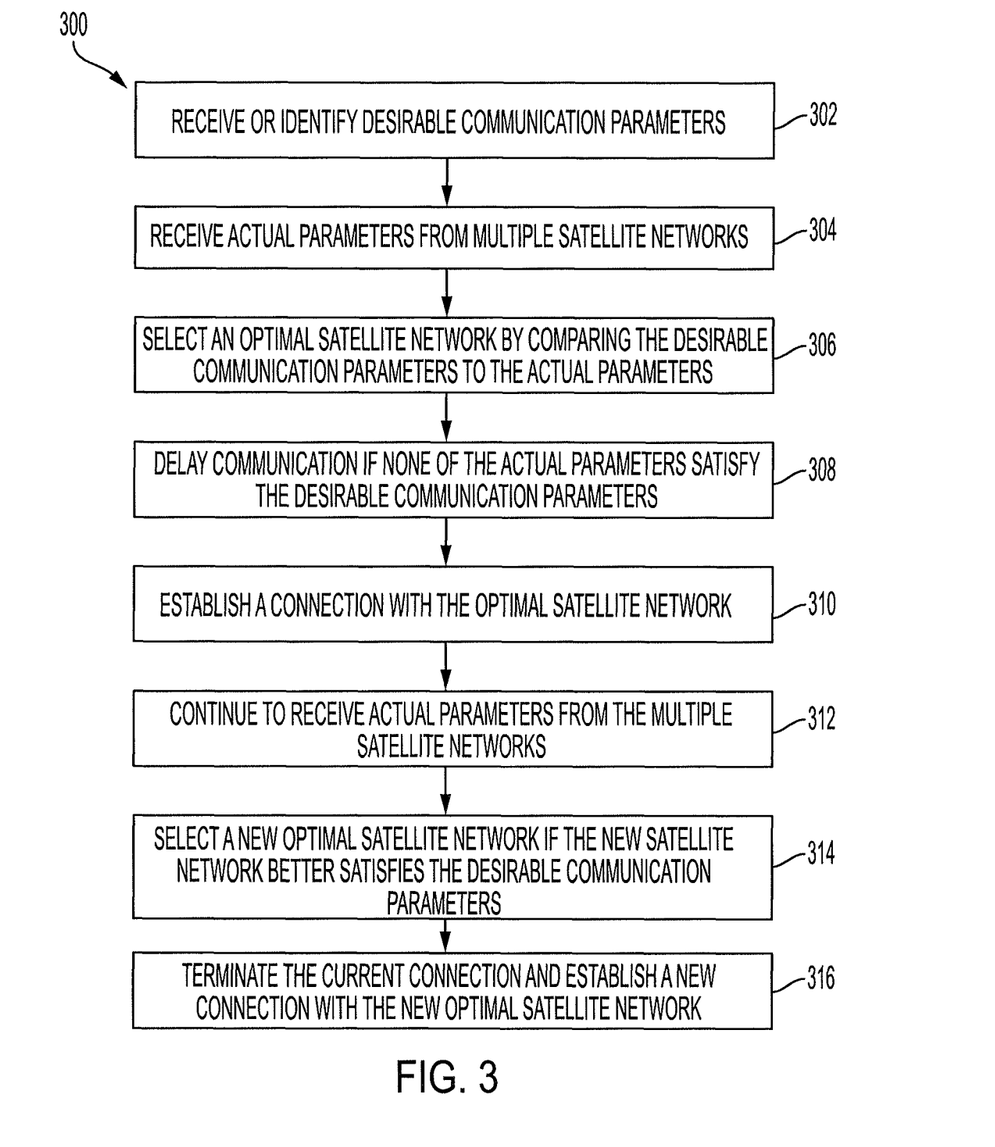
FIG. 3 is a flowchart illustrating a method for network agnostic satellite communications according to an embodiment of the present disclosure.

Turning to FIG. 3, a method 300 for performing dynamic satellite communications is shown. The method 300 may be performed, for example, by components of a satellite communication receiver, such as the receiver 108 of FIG. 1 or the remote terminal 202 of FIG. 2.

In block 302, the processor may receive or identify the desirable communication parameters. In block 304, the processor may determine or receive actual parameters from the multiple satellite networks (e.g., corresponding to the service providers 103, 105, 107 and received via the satellites 102, 104, 106 of FIG. 1). As described above, the processor may determine some of the actual parameters and may receive others of the actual parameters.

In block 306, the processor may select an optimal satellite network by comparing the desirable communication parameters to the actual parameters. The processor may select the optimal satellite network as the network that has actual parameters that best satisfy the desirable communication parameters. For example, if the desirable communication parameters include a cost per bit of data transferred, the processor may select the satellite network that has the lowest cost per bit of data. In some embodiments, the desirable communication parameters may include multiple parameters. In that regard, the processor may identify the optimal satellite network as the network that satisfies the most of the desirable communication parameters. In some embodiments, the desirable communication parameters may be ranked by importance, and the processor can select the optimal network based on the actual parameters and the ranking.

In block 308, if the actual parameters of each of the satellite networks fail to satisfy the desirable communication parameters then the processor may delay communication until at least one of the satellite networks satisfies the desirable communication parameters. For example, if the desirable communication parameter is a desirable cost per bit of data then the processor may delay communication until at least one of the satellite networks has a cost per bit of data that is less than or equal to the desirable cost per bit of data. In some embodiments, the communication may be indicated as relatively important (such as by a user providing such indication) and the processor may forgo the delay and select the satellite network having the lowest cost per bit of data.

In block 310, the processor may establish a communication link with the optimal satellite network. For example, the processor may use information stored in the memory, such as algorithms or protocols, in order to allow the processor to communicate via the specific protocols or algorithms required by the selected satellite network.

In block 312, the processor may continue to receive or determine actual parameters corresponding to the multiple satellite networks. In block 314, the processor may select a new satellite network if the new satellite network better satisfies the desirable communication parameters. In block 316, the processor may terminate the current communication link and establish a new communication link with the new optimal satellite network. The transition to the new optimal satellite network may be relatively seamless.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for network agnostic satellite communications, comprising:
an antenna configured to receive at least one antenna receive beam from at least two satellites, the at least one antenna receive beam including multiple receive carriers multiplexed in at least one of frequency or time, with the at least two satellites representing at least two separate satellite networks;
a signal processor configured to receive the multiple receive carriers and to extract data from at least one receive carrier of the multiple receive carriers;
an input device configured to receive at least one desirable communication parameter; and
a control processor configured to:
determine actual parameters corresponding to the multiple receive carriers of the at least one antenna receive beam through local calculations and measurements,
select an optimal receive carrier by comparing the at least one desirable communication parameter to the actual parameters, and
establish a current communication link with the optimal receive carrier.

2. The system of claim 1 further comprising a first non-transitory context memory configured to store a first network configuration corresponding to the optimal receive carrier, the first network configuration including at least one of:
a carrier frequency;
at least one of a modulation or a demodulation waveform definition;
at least one of an encoding or a decoding algorithm definition;
a satellite ephemeris;
a network access parameter;
a locally measured network performance parameter;
an externally provided network performance parameter;
a user history;
a ranking;
a data priority;
a data schedule; or
a data buffer.

3. The system of claim 2 further comprising a second non-transitory context memory configured to store a second network configuration corresponding to another receive carrier, wherein the control processor is configured to establish a new communication link with the another receive carrier by controlling the antenna, and the signal processor to implement the second network configuration stored in the second non-transitory context memory.

4. The system of claim 1 wherein the at least one antenna receive beam is received from a dynamic capacity pool of satellite communication links that is provided by at least one of existing satellite communication provider or a reseller of satellite communication services.

5. The system of claim 4 wherein the control processor is further configured to select the optimal receive carrier based on the at least one desirable communication parameter and at least one of:
a current location of the antenna;
hardware constraints of at least one of the antenna or the signal processor;
locally measured network performance parameters determined by the control processor and externally provided network performance parameters received via a network management link.

6. The system of claim 1 wherein the control processor is further configured to receive network parameters corresponding to the multiple receive carriers of the at least one antenna receive beam via a network management link from a network operating center, and to select the optimal receive carrier based on the received network parameters.

7. The system of claim 1 wherein the control processor is further configured to determine the actual parameters corresponding to the multiple receive carriers of the at least one antenna receive beam based on an analysis of the multiple receive carriers by the signal processor.

8. The system of claim 1 further comprising an output device configured to output data, wherein:
the input device is further configured to receive user data; and
the control processor is configured to establish the current communication link with the optimal receive carrier by instructing the signal processor to extract the data from the optimal receive carrier, causing the output device to output the extracted data, and instructing the signal processor to place the received user data on a transmit carrier that is associated with the optimal receive carrier.

9. The system of claim 1 wherein the control processor is configured to continuously or periodically determine the actual parameters corresponding to the multiple receive carriers, and to select a new optimal receive carrier when new actual parameters better match the at least one desirable communication parameter.

10. The system of claim 1 wherein the desirable communication parameter includes user-defined priority data types, and the control processor is further configured to defer at least one lower-priority data type until a more optimal receive carrier is available.

11. A method for network agnostic satellite communications, comprising:
receiving or determining, by a processor of a satellite communication terminal, at least one desirable communication parameter;
receiving, by an antenna of the satellite communication terminal, at least one antenna receive beam from at least two satellites, the at least one antenna receive beam having multiple receive carriers multiplexed in at least one of frequency or time, with the at least two satellites representing at least two separate satellite networks;
receiving and determining, by the processor, actual parameters corresponding to the multiple receive carriers of the at least one antenna receive beam, the determining the actual parameters includes at least one of a calculation or a measurement performed at or by the satellite communication terminal;
selecting, by the processor, an optimal satellite network by comparing the at least one desirable communication parameter to the actual parameters; and establishing, by the processor, a current communication link between the processor and the optimal satellite network.

12. The method of claim 11 wherein the at least one desirable communication parameter includes at least one of a cost per bit of data transferred, a cost per minute of voice data, a response time of the at least two separate satellite networks, an available bandwidth of the at least two separate satellite networks, a reliability of the at least two separate satellite networks, link congestion of the at least two separate satellite networks, a signal to noise ratio, a bit error rate, priority of data to be transmitted or received, a data security level or feature, or a hardware constraint of the satellite communication terminal.

13. The method of claim 11 further comprising:
selecting, by the processor, a new optimal satellite network if the new optimal satellite network better satisfies the at least one desirable communication parameter; and
terminating, by the processor, the current communication link and establishing, by the processor, a new communication link with the new optimal satellite network in response to selecting the new optimal satellite network.

14. The method of claim 11 wherein establishing the current communication link includes signal processing functions of at least one of selecting modulation and demodulation waveforms that correspond to the optimal satellite network or implementing new encoding and decoding algorithms that correspond to the optimal satellite network.

15. The method of claim 11 further comprising receiving, by an input device of the satellite communication terminal, the at least one desirable communication parameter, wherein receiving, by the processor, the at least one desirable communication parameter includes receiving the at least one desirable communication parameter from the input device.

16. The method of claim 11 further comprising:
determining, by the processor, that each of the at least two separate satellite networks fails to satisfy the at least one desirable communication parameter; and
delaying, by the processor, the establishing the current communication link until at least one of the at least two separate satellite networks satisfies the at least one desirable communication parameter.

17. The method of claim 11 further comprising storing, in a memory of the satellite communication terminal, communication data usable by the processor to establish a communication link with each of the at least two separate satellite networks, wherein establishing the current communication link includes selecting and implementing, by the processor, the communication data that corresponds to the optimal satellite network.

18. The method of claim 11 wherein receiving and determining the actual parameters corresponding to the at least two separate satellite networks includes determining, by the processor, at least a first actual parameter of the actual parameters and receiving, by the processor, at least a second actual parameter from each of the at least two separate satellite networks.

19. The method of claim 11 wherein the at least two separate satellite networks are part of a dynamic capacity pool and are each available on a dynamic basis.

20. A method for network agnostic satellite communications, comprising:
receiving, by an antenna, at least one antenna receive beam from at least two satellites, the at least one antenna receive beam having multiple receive carriers multiplexed in at least one of frequency or time, with the at least two satellites representing at least two separate satellite networks;
extracting, by a signal processor, data from at least one receive carrier of the multiple receive carriers;
receiving, by an input device, at least one desirable communication parameter;
determining, by a control processor, actual parameters corresponding to the multiple receive carriers of the at least one antenna receive beam through local calculations or measurements;
selecting, by the control processor, an optimal receive carrier by comparing the at least one desirable communication parameter to the actual parameters; and
establishing, by the control processor, a current communication link with the optimal receive carrier.

* * * * *